x

US010554350B2

(12) United States Patent
Srivastava et al.

(10) Patent No.: US 10,554,350 B2
(45) Date of Patent: Feb. 4, 2020

(54) SUB-PARTITIONING OF WIRELESS WIDEBAND CHANNEL AND USAGE

(71) Applicant: Time Warner Cable Enterprises LLC, New York, NY (US)

(72) Inventors: Praveen C. Srivastava, Ashburn, VA (US); Rajesh M. Gangadhar, Ashburn, VA (US); Hussain Zaheer Syed, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 651 days.

(21) Appl. No.: 14/817,724

(22) Filed: Aug. 4, 2015

(65) Prior Publication Data
US 2017/0041106 A1 Feb. 9, 2017

(51) Int. Cl.
*H04L 5/00* (2006.01)
*H04W 72/04* (2009.01)

(52) U.S. Cl.
CPC .................. *H04L 5/0007* (2013.01)

(58) Field of Classification Search
CPC ..... H04W 2/04; H04W 72/04; H04W 72/042; H04W 88/08; H04L 5/0007
See application file for complete search history.

(56) References Cited

U.S. PATENT DOCUMENTS

| | | | | | |
|---|---|---|---|---|---|
| 6,301,233 | B1* | 10/2001 | Ku | ........................ | H04W 16/10 370/322 |
| 6,819,930 | B1* | 11/2004 | Laroia | ................... | H04W 72/14 370/329 |
| 7,623,490 | B2* | 11/2009 | Khandekar | ........... | H04L 1/0001 370/329 |
| 7,936,782 | B2* | 5/2011 | Qin | ..................... | H04W 72/085 370/329 |
| 7,957,346 | B2* | 6/2011 | Nabetani | ............... | H04W 28/20 370/329 |
| 8,094,616 | B2* | 1/2012 | Choi | ..................... | H04L 5/0016 370/329 |

(Continued)

Primary Examiner — Mark H Rinehart
Assistant Examiner — Sanjay K Dewan
(74) Attorney, Agent, or Firm — Armis IP Law, LLC

(57) ABSTRACT

A communication management resource associated with a wireless access point in a network environment allocates use of a wireless channel and sub-channels over time to multiple communication devices in communication with the wireless access point. For example, during use, from a first communication device of the multiple communication devices competing for wireless bandwidth, the communication management resource receives a request for allocation of wireless bandwidth to communicate over a wireless communication link with the wireless access point. Subsequent to receiving the request, the communication management resource identifies an appropriate amount of wireless bandwidth suitable to satisfy the request for bandwidth from the first communication device. In accordance with the identified amount of wireless bandwidth needed to satisfy the request, the communication management resource subdivides the wireless channel for use by the first communication device and potentially other communication devices that request use of the available wireless bandwidth.

26 Claims, 9 Drawing Sheets

(56) References Cited

U.S. PATENT DOCUMENTS

| | | | | |
|---|---|---|---|---|
| 8,204,147 B2 * | 6/2012 | Josiam | H04W 72/0413 | 370/320 |
| 8,331,516 B2 * | 12/2012 | Yoo | H04L 5/0092 | 375/360 |
| 8,942,192 B2 * | 1/2015 | Damnjanovic | H04W 72/04 | 370/329 |
| 8,964,703 B2 * | 2/2015 | Chen | H04L 5/0007 | 370/328 |
| 9,014,112 B2 * | 4/2015 | Ganu | H04W 16/10 | 370/311 |
| 2009/0190541 A1 * | 7/2009 | Abedi | H04W 16/10 | 370/329 |
| 2009/0274105 A1 * | 11/2009 | Choi | H04L 5/0016 | 370/329 |
| 2010/0118794 A1 * | 5/2010 | Horn | H04W 72/042 | 370/329 |
| 2011/0064062 A1 * | 3/2011 | Lee | H04W 16/04 | 370/338 |
| 2011/0228742 A1 * | 9/2011 | Honkasalo | H04L 5/0007 | 370/330 |
| 2012/0230267 A1 * | 9/2012 | Sundaresan | H04W 72/06 | 370/329 |
| 2012/0307633 A1 * | 12/2012 | Collings | H04W 72/0486 | 370/230 |
| 2013/0070722 A1 * | 3/2013 | Li | H04L 5/0003 | 370/329 |
| 2014/0241296 A1 * | 8/2014 | Shattil | H04B 7/026 | 370/329 |
| 2015/0063265 A1 * | 3/2015 | Seo | H04W 72/1289 | 370/329 |
| 2015/0365940 A1 * | 12/2015 | Chu | H04B 7/0452 | 370/329 |
| 2016/0143005 A1 * | 5/2016 | Ghosh | H04W 72/042 | 370/329 |

* cited by examiner

| NETWORK ADDRESS | DEVICE INFO. 171 DEVICE TYPE |
|---|---|
| 2XXX | REFRIGERATOR |
| 3XXX | OVEN |
| ... | |
| 8XXX | MOBILE COMPUTER |

FIG. 2

SUB-PARTITIONING OF WIRELESS WIDEBAND CHANNEL AND USAGE

BACKGROUND

Conventional wireless networks typically include multiple communication resources (such as one or more WiFi™ access points) facilitating wireless communications with one or more mobile communication devices in a respective wireless region. For example, a conventional wireless network may include: a first wireless access point providing wireless coverage to a first region in a network environment; a second wireless access point providing wireless coverage to a second region in the network environment; etc.

Via communications through a selected one of the multiple base stations, a respective user of the mobile communication device in the home environment is able to wirelessly communicate through a wireless access point over the Internet.

In certain instances, multiple communications devices reside within the same region of wireless coverage of a respective wireless access point. In such an instance, according to conventional techniques, the multiple communication devices compete amongst each other for use of a single available wireless channel to convey communications to the respective wireless access point. The bandwidth of the single available wireless channel may vary depending upon how much of the available bandwidth is required by a respective client device requesting use of the wireless channel.

Additionally, the bandwidth of the single available channel may vary depending upon the degree of interference with other wireless devices using the available wireless bandwidth.

BRIEF DESCRIPTION OF EMBODIMENTS

Conventional techniques of allocating bandwidth in a wireless network environment suffer from deficiencies. For example, according to conventional techniques as previously discussed, each of multiple communication devices must use the same WiFi™ channel at different times in order to communicate with a respective wireless access point allocating use of the channel. Further, according to conventional WiFi™ standards, the minimum amount of bandwidth that can be allocated for use by the multiple communication devices is 20 MHz. These two attributes (i.e., shared use of the same channel and minimum bandwidth of 20 MHz) of a conventional WiFi™ communication system make it very inefficient for low bandwidth, low latency type of wireless applications.

Embodiments herein deviate with respect to conventional techniques to provide a more efficient use of the available wireless spectrum. For example, embodiments herein include enhancing the current WiFi™ specification to allow efficient use of an available wireless spectrum by multiple narrowband/wideband WiFi™ devices competing to communicate with a respective wireless access point.

More specifically, in accordance with one example embodiment, a communication management resource such as associated with a wireless access point in a network environment allocates use of a wireless channel over time to multiple communication devices. The communication management resource receives a request from a first communication device for allocation of wireless bandwidth to communicate over a wireless communication link. In response to receiving the request, the communication management resource then identifies an amount of wireless bandwidth suitable to satisfy the request for bandwidth from the first communication device. In contrast to conventional techniques, and in accordance with the identified amount of wireless bandwidth needed to satisfy the request, the communication management resource subdivides the wireless channel for use by the first communication device and potentially other devices as well.

In one embodiment, the wireless channel is a channel of predetermined bandwidth (such as a minimum bandwidth 20 MHz channel) available for use by multiple communication devices in the network environment. In these circumstances in which the identified amount of wireless bandwidth is substantially less than full capacity of the wireless channel, instead of allocating the whole available channel, the wireless access point allocates an appropriate less-than-all portion of the wireless channel to the first communication device. The first communication device then uses the allocated less-than-all portion of the wireless channel (i.e., an allocated sub-channel) to communicate data over the wireless communication link to the wireless access point.

In accordance with further embodiments, the wireless channel is subdivided for simultaneous use by multiple communication devices. For example, in one embodiment, the less-than-all portion of the wireless channel allocated for use by the first communication device is a first portion of the wireless channel. The communication management resource can be configured to allocate a second portion of the wireless channel for simultaneous use by a second communication device of the multiple communication devices. Subsequent to allocation as previously discussed, the first communication device uses the first portion of the wireless channel to communicate data to the respective wireless access point. Additionally, the second communication device uses the second portion of the wireless channel to communicate data to the wireless access point while the first communication device uses the first portion of the wireless channel to communicate with the wireless access point.

Accordingly, in contrast to conventional techniques, instead of sharing a single channel, embodiments herein include subdividing a respective available channel (such as a channel of minimal size or other standard channel) into multiple portions (sub-channels) and allocating such portions for use by multiple communication devices to simultaneously communicate with the wireless access point.

In yet further embodiments, in response to detecting completion of the first communication device using the less-than-all portion of the channel to transmit a data payload, the communication management resource relocates the less-than-all portion of the channel or possibly combines the less-than-all portion with other available bandwidth to produce a new sub-channel of yet different bandwidth capacity for a same or different communication device.

As further discussed herein, a size of the sub-channels assigned for simultaneous use by each of the multiple communication devices can vary depending upon attributes of the communication device and/or a corresponding application requesting use of wireless bandwidth. For example, in one embodiment, the communication management resource identifies a classification type of an application on a respective communication device generating the request for allocation of the wireless bandwidth. The communication management resource then maps the identified classification type to corresponding flow service settings associated with the application and/or identified device type. As specified by the flow service settings, the communication management resource allows conveyance of communications over one or more subdivided portions of the wireless channel allocated for use by the first communication device.

As further discussed herein, the communication management resource can receive notification that the first communication device is in wireless communication with a second communication device. In such an instance, the first communication device resides in a communication path between the wireless access point and the second communication device. In a downstream direction, the first communication device relays messages from the wireless access point to the second communication device. In an upstream direction, the first communication device relays messages from the second communication device to the wireless access point. Thus, embodiments herein can include serial wireless connectivity and shared use of available bandwidth amongst multiple communication devices.

As further discussed below, embodiments herein provide more flexibility of using an available wireless bandwidth (such as a wireless channel) amongst multiple users competing to communicate with a respective wireless access point.

These and other more specific embodiments are disclosed in more detail below.

Note that any of the resources as discussed herein can include one or more computerized devices, controllers, wireless access points, set top boxes, servers, base stations, wireless communication equipment, communication management systems, workstations, handheld or laptop computers, or the like to carry out and/or support any or all of the method operations disclosed herein. In other words, one or more computerized devices or processors can be programmed and/or configured to include a communication management resource and operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that supports operations as discussed herein.

One or more embodiments herein include computer readable storage media and/or system having instructions stored thereon. In accordance with one embodiment, the instructions, when executed by computer processor hardware, cause the computer processor hardware to: receive a request from a first communication device (of multiple communication devices) for allocation of wireless bandwidth to communicate over a wireless communication link with a wireless access point; identify an amount of wireless bandwidth suitable to satisfy the request for bandwidth from the first communication device; and subdivide the wireless channel for use by the first communication device to communicate with the wireless access point.

Another embodiment herein includes a computer readable storage media and/or system having instructions stored thereon. The instructions, when executed by computer processor hardware, cause the computer processor hardware to: in response to receiving a first bandwidth request from a first communication device and a second bandwidth request from a second communication device for use of wireless bandwidth, subdivide an available wireless spectrum to include a first wireless sub-channel and a second wireless sub-channel; allocate the first wireless sub-channel for use by the first communication device; and allocate the second wireless sub-channel for use by the second communication device. The first wireless sub-channel and the second wireless sub-channel allocated for simultaneous use.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As further discussed herein, techniques herein are well suited for allocation and simultaneous use of wireless sub-channels of differing bandwidth capacity. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating device information correlating network address information to device type information according to embodiments herein.

Figure 1:
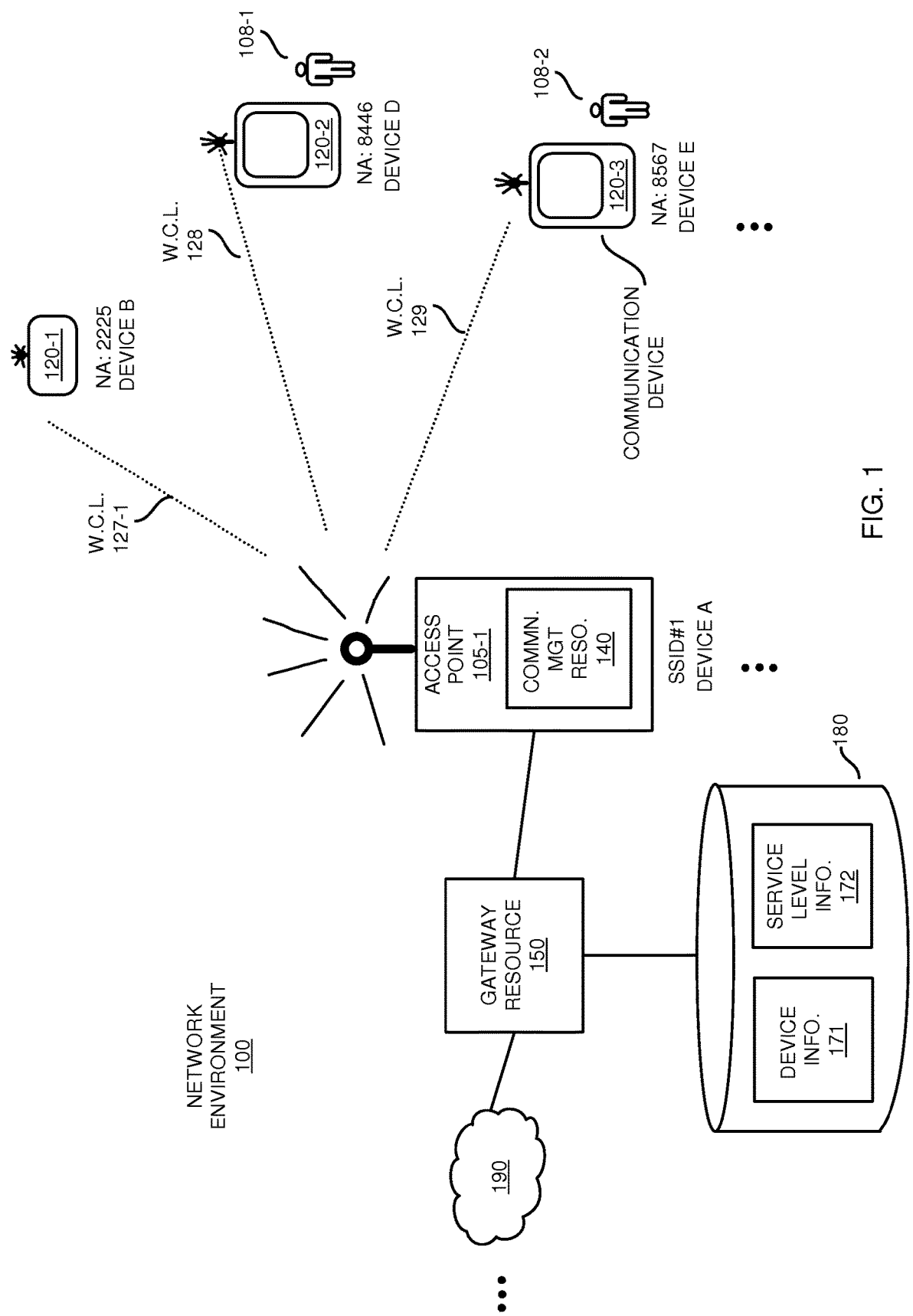
FIG. 1 is an example diagram illustrating a network environment as well as allocation and simultaneous use of a partitioned wireless channel (one or more sub-channels) by multiple communication devices according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Embodiments herein provide a more efficient use of available wireless spectrum in a wireless communication system, including those that support WiFi-like communications. For example, in accordance with one embodiment, a communication management resource managing communications associated with a wireless access point (such as a modified WiFi™ access point) in a network environment allocates use of a wireless channel over time to multiple communication devices. Assume that the communication management resource receives a request originating from a first communication device of multiple communication devices competing for use of available bandwidth associated with the wireless access point. To fulfill the request of the first communication device, the communication management resource identifies an amount of wireless bandwidth to satisfy the request for bandwidth from the first communication device.

In one embodiment, the amount of allocated bandwidth depends upon one or more factors such as the type of the communication device, type of data being transmitted, type of application testing to transmit the data, a type of subscription purchased by the owner of the first communication device, etc.

In contrast to conventional techniques, and in accordance with the identified amount of wireless bandwidth needed or appropriate to satisfy the request, the communication management resource subdivides the wireless channel for use. At least a portion of the subdivided wireless channel is allocated for use by the first communication device. Further embodiments herein include subdividing the available channel into multiple sub-channels and providing appropriate notifications indicating that the multiple sub channels are available for use by multiple communication devices to simultaneously communicate with the wireless access point.

Now, more specifically, FIG. 1 is an example diagram illustrating a network environment and simultaneous use of a partitioned wireless channel by multiple communication devices according to embodiments herein.

As shown, network environment 100 includes wireless access point 105-1, which is one of multiple wireless access points in the network environment 100. The wireless access points in the network environment 100 collectively provide communication devices 120 access to network 190 (which may include the Internet as well as any other number of networks).

Further in this example embodiment, assume that each of the communication devices 120 establishes a respective wireless communication link with the wireless access point 105-1.

For example, as shown, the communication device 120-1 establishes a respective wireless communication link 127-1 with wireless access point 105-1; the communication device 120-2 establishes a respective wireless communication link 128 with wireless access point 105-1; the communication device 120-3 establishes a respective wireless communication link 129 with wireless access point 105-1; and so on.

Such communication links can be established in accordance with any suitable wireless protocol.

As shown, network environment 100 further includes gateway resource 150. As its name suggests, gateway resource 150 provides and/or controls access to remote network 190 such as the Internet. For example, in one embodiment, when allocated bandwidth, the mobile communication device 120-1 (i.e., device B such as a refrigerator) transmits communications to the wireless access point 105-1 over respective wireless communication link 127-1. In such an instance, the wireless access point 105-1 forwards the payload data (data packets, blocks of data, etc.) in wireless communications from the mobile communication device 120-1 through gateway resource 150 to network 190, where corresponding data packets are distributed to the appropriate one or more target destinations.

In a reverse direction, the wireless access point 105-1 receives communications directed to the mobile communication device 120-1 from network 190. The wireless access point 105-1 conveys the communications over the respective wireless communication link 127-1 to mobile communication device 120-1.

Note that the network environment 100 and corresponding wireless access points including wireless access point 105-1 can be configured to support short-range or a long-range communications in accordance with any suitable wireless protocol. In one non-limiting example embodiment, the wireless access point 105-1 can be configured to support wireless communications in accordance with any of one or more (modified or not) WiFi™ protocols. If desired, the antennas associated with the wireless access points 105 can support beamforming or spatial division multiple access techniques such that frequencies can be reused in different directions in the network environment 100.

In one embodiment, to provide spatial isolation amongst multiple mobile communication devices and wireless access points in network environment 100, embodiments herein can include implementing spatial division multiple access (SDMA) techniques (such as those implementing MU-MIMO) when allocating use of subdivided portions of respective wireless channels. The spatial isolation resulting from spatial division multiple access techniques prevents interference amongst wireless interference and supports reuse of the available wireless spectrum. To notify resources (such as mobile communication devices, wireless access points, etc.) of the presence and availability of respective wireless access points 105, each of the wireless access points repeatedly (over time) can be configured to generate and broadcast communications (such as wireless beacons) in network environment 100. In one embodiment, the signals, such as beacons, include an SSID (name or unique identifier value) assigned to the respective wireless access point transmitting the communication. Accordingly, each of the communication devices 120 is aware of the presence of the wireless access point 105-1 in network environment 100.

In certain instances, subsequent to learning of a presence and availability of a particular wireless access point in its vicinity, a corresponding communication device can initiate further communications with the particular wireless access point to retrieve additional information if desired. The additional information can include a BSSID (such as a unique network address) assigned to the respective wireless access point, vendor information indicating a vendor to which the particular wireless access point is assigned, etc.

In accordance with yet further embodiments, the wireless access point 105-1 can be configured to, in any suitable manner, notify the communication devices 105 of channel partitioning capability as further discussed herein. In contrast to conventional WiFi™ communication systems, the channel partitioning capability as described herein enables multiple different types of communication devices to simultaneously communicate over multiple dynamically allocated channels and/or sub-channels with the wireless access point.

More specifically, assume that the communication device 120-1 (device B assigned network address 2225) would like to transmit data in an uplink direction on wireless communication link 127-1 to the wireless access point. In such an instance, the communication management resource 140 receives a first bandwidth request originated by a respective application in communication device 120-1. The communication device transmits the request over the communication link 127-1. Assume further that the communication device 120-2 (device D assigned network address 8446) would like to transmit data in uplink direction on wireless communication link 128 to the wireless access point 105-1. The communication device 120-2 transmits the request over communication link 128 to the wireless access point. The communication management resource 140 receives the second bandwidth request originated by a respective application in communication device 120-2.

In response to receiving the first bandwidth request from the first communication device 120-1 and second bandwidth request from a second communication device 120-2 for use of available wireless bandwidth in network environment 100, the communication management resource 140 subdivides an available wireless spectrum (such as a single variable bandwidth channel) to include at least a first wireless sub-channel and a second wireless sub-channel for simultaneous use by the communication device 120-1 and communication device 120-2.

Subsequent to subdividing the available wireless bandwidth, the communication management resource 140 allocates the first wireless sub-channel for use by the first communication device 120-1. Additionally, the communication management resource 140 allocates the second wireless sub-channel for use by the second communication device.

Subsequent to allocation of the sub-channels, each of the first communication device 120-1 and second communication device 120-2 simultaneously use the first wireless sub-channel and the second wireless sub-channel to communicate data to the wireless access point 105-1. In a manner as previously discussed, in the upstream direction, the wireless access point 105-1 further transmits the received data through gateway resource 150 to network 190.

Note that, although the communication management resource 140 is shown as being located in the wireless access point 105-1, the communication management resource 140 can reside at any suitable location. For example, the communication management resource 140 alternatively can be located in the gateway resource 150, in a respective communication device itself, or in its own separate communication path with respect to any of the resources in network environment 100.

In accordance with further embodiments, allocation of sub-channels can depend upon a number of factors. For example, in one embodiment, the communication management resource 140 controls allocation of the available bandwidth based upon any of one or more parameters such as a type of the corresponding communication device, the type of application transmitting corresponding data, the type of data being transmitted, subscription level of the corresponding owner of the communication device, etc., over a respective wireless link to the wireless access point 105-1.

In one embodiment, each of the communication devices 120 is assigned different network address information. The respective network address information assigned to a communication device can be encoded in such a manner that it is possible to identify a corresponding device type of the communication device requesting bandwidth. As described herein, certain types of communication devices such as communication device 120-1 may require only low bandwidth (such as less than 3 MHz bandwidth) wireless capability. In contrast, communication devices such as communication device 120-2 and communication device 120-3 (such as computer devices operating respective browser applications) require much higher bandwidth (such as greater than 10 MHz bandwidth).

As a more specific example, assume that the communication device 120-1 generates and transmits a request over wireless communication link 127-1 to the wireless access point 105-1 for allocation of first wireless bandwidth. The request can include identifier information (such as part of a network address) indicating the type associated with the communication device. In this example embodiment, the communication device 120-1 transmits the unique identifier value such as network address information 2225 along with the request over wireless communication link 127-1 to the communication management resource 140.

Further in this example embodiment, to determine the type of device transmitting the request for bandwidth, the communication management resource 140 accesses and utilizes the device information 171 stored in repository 180. In general, FIG. 2 is an example diagram illustrating an example of device information 171 according to embodiments herein.

Using the device information 171 and the received network address 2225 or other suitable device type identifier, the communication management resource 140 is able to identify a device classification type assigned to the communication device 120-1. In one embodiment, the first digit "2" indicates in the network address information 2225 indicates that the device type is a refrigerator. Accordingly, embodiments herein can include utilizing network address information received from the first communication device 120-1 (and mask such as 2XXX) to identify a classification type assigned to the first communication device 120-1. As mentioned, the device information 171 in this example indicates that the communication device 120-1 (assigned network address 2225) is a refrigerator known to require only low bandwidth conveyance of data.

Assume further that the communication device 120-2 generates and transmits a request over wireless communication link 128 to the wireless access point 105-1 for allocation of wireless bandwidth. As previously discussed, the request can include identifier information indicating the classification type associated with the communication device 120-2. In this example embodiment, the communication device 120-2 transmits the network address information 8446 along with the bandwidth request over wireless communication link 128 to the communication management resource 140.

To determine the type of device transmitting the request for bandwidth, the communication management resource 140 accesses the device information 171 stored in repository 180. Using the device information 171 (in FIG. 2) and the received network address information 8446 (assigned to device D), the communication management resource 140 is able to identify a device classification type assigned to the communication device 120-2. In one embodiment, the first digit "8" in the network address information 8446 indicates that the device type is a computer device (supporting applications such as browsers that retrieve and playback content on a media player application). Accordingly, embodiments herein include utilizing a network address received from the first communication device 120-2 (and applying mask 8XXX or other suitable processing) to identify a classification type and bandwidth eligibility assigned to the first communication device 120-2. If desired, the device information 171 in this example can further indicate that the communication device 120-2 (assigned network address 8446) is a computer device known to require high bandwidth conveyance of data.

As further discussed herein, the communication management resource 140 can be configured to take into account the classification type of the communication device requesting wireless bandwidth when subdividing available wireless bandwidth for use by each of the different communication devices. For example, as previously discussed, it may be known that the communication device 120-1 (which is a refrigerator) may require use of only low bandwidth (such as less than 5 MHz) to convey data. Conversely, it may be known that the communication device 120-2 (which is a mobile computer) may require high bandwidth (such as greater than 15 MHz) to convey data.

In one embodiment, the communication management resource 140 utilizes the determined device classification type at least in part to determine how to partition a respective channel into multiple sub-channels for use by competing communication devices 120.

As further discussed below, note that the communication management resource 140 can be configured to use further information (such as service-level information 172) to determine how to fairly partition available wireless bandwidth (such as one or more channels) for use by each of the multiple communication devices 120.

Figure 3:
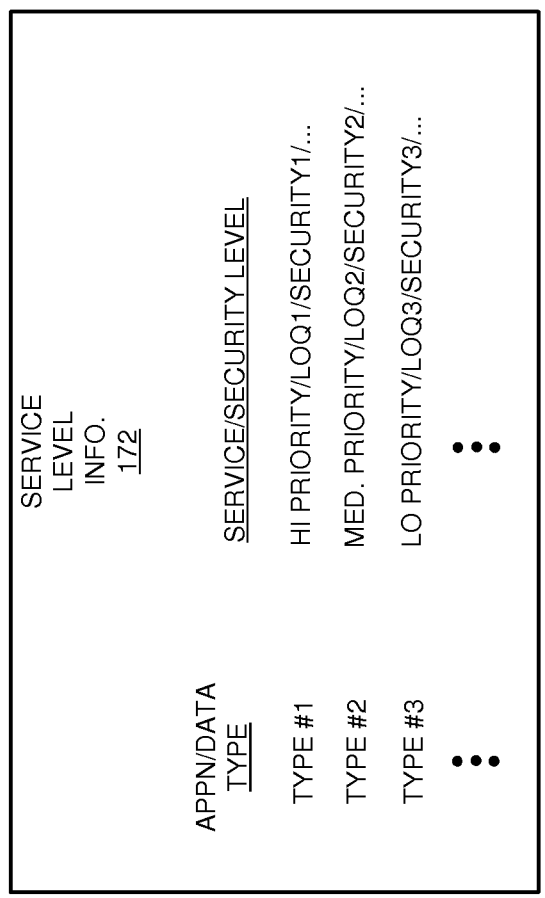
FIG. 3 is an example diagram illustrating an example of service level information correlating application/data/user/etc. to service level information according to embodiments herein.

For example, FIG. 3 is an example diagram illustrating an example of service level information 172 correlating application/data to service level information according to embodiments herein. In addition to, or as an alternative to using the network address information or corresponding device type information received from the communication device requesting bandwidth, the communication management resource 140 can be configured to process a respective bandwidth request, and potentially identify from the request communication itself, information such as a type of application making the request for bandwidth, a type of data to be transmitted, etc. This further information can be used as a basis to identify how much bandwidth to allocate to a respective requesting communication device.

Using service level information 172 as shown in FIG. 3, in this example embodiment, the communication management resource 140 maps respective information such as application/data/subscriber type (as determined from a received communication from the requesting communication device) to the appropriate service level, security, etc., to be provided to the requesting communication device. The appropriate level of service can indicate a level of quality of transmitting data, latency of transmitting data, security Lowell associated with transmitting data for a particular type of communication device, etc.

Accordingly, the communication management resource 140, when identifying an amount of bandwidth to allocate for use by respective communication devices, can be configured to identify service level settings associated with an application and/or mobile communication device generating the request for the wireless bandwidth. The communication management resource 140 then subdivides the wireless channel in accordance with the service level settings as further discussed below.

In one embodiment, security parameters can be tied to device type in addition to the usual security parameters that apply to service flow. For example, in one embodiment, when allocating use of subdivided portions of one or more wireless channels to the communication devices 120, the communication management resource 140 identifies a classification type associated with the communication device generating the request for allocation of the wireless bandwidth. The communication management resource 140 utilizes the service-level information 172 to identify security setting information assigned to the identified classification type of the requesting communication device. As specified by the identified security setting information assigned to the type associated with communication device, the communication manager resource 140 implements the specified security (as indicated in service-level information 172) when transmitting communications over a subdivided portion of the wireless channel to the requesting communication device. As mentioned above, the security parameters tied to the device type can be in addition to usual security parameters that apply to a respective service flow.

Figure 4:
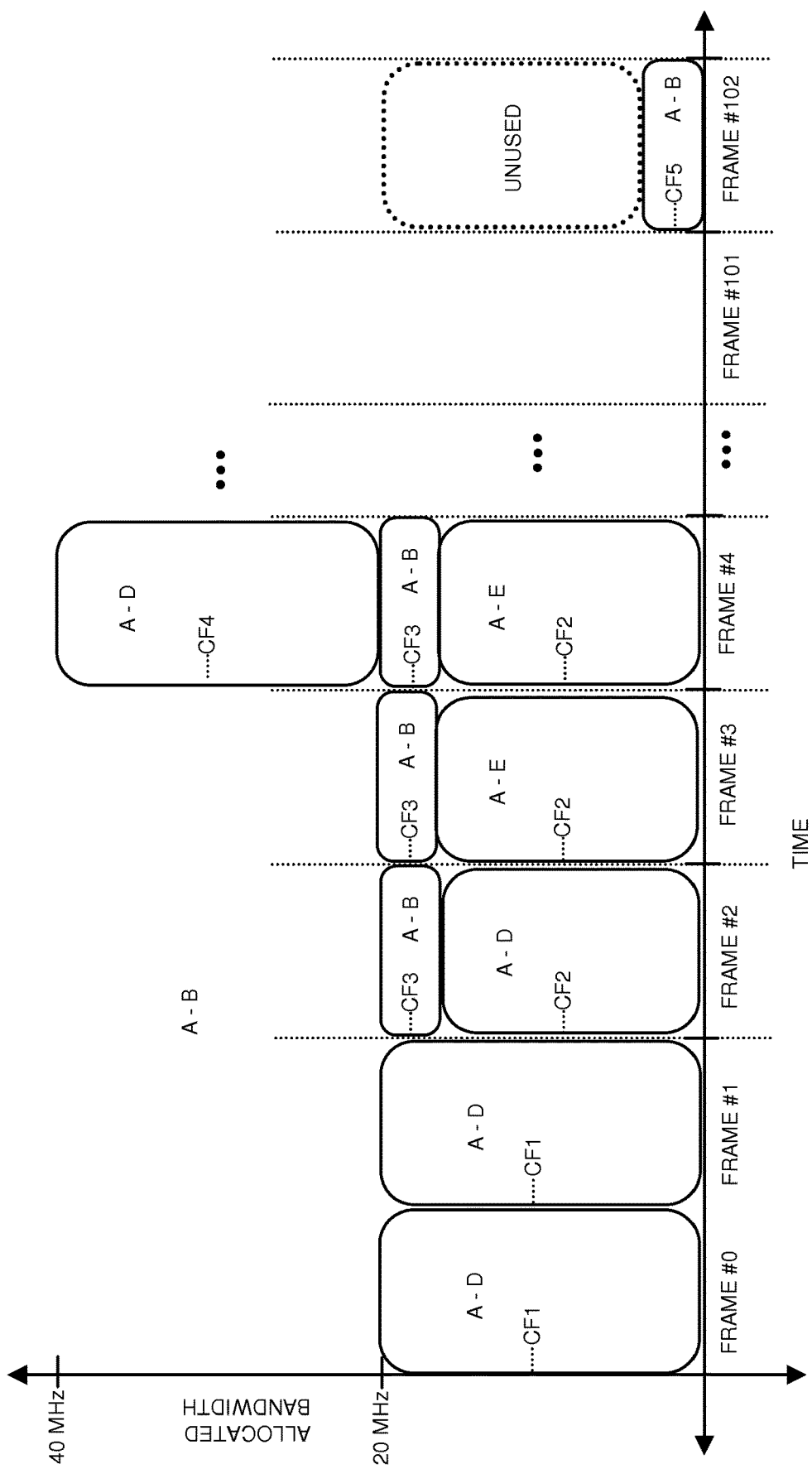
FIG. 4 is an example diagram illustrating allocation of one or more channels/sub-channels over multiple frames to multiple communication devices according to embodiments herein.

FIG. 4 is an example diagram illustrating allocation of one or more channels/sub-channels over multiple frames to multiple communication devices according to embodiments herein.

As further shown, the communication management resource 140 allocates use of the wireless spectrum (such as a selected channel bandwidth of 20 MHz, minimum sized WiFi™ channel, 40 MHz, 80 MHz, 160 channel, etc.) in different time frames for use by the different communication devices 120.

For example, for frame #1, the communication management resource 140 allocates use of channel A-D (such as a 20 MHz channel to communicate between device D and device A) for use by the communication device 120-2. Prior to allocation and use of bandwidth in frame #1, the communication management resource 140 potentially allocates the wireless channel for use by another communication device such as communication device 120-2 in frame #0 or prior.

Subsequent to allocation in frame #0, during frame #1, the communication device 120-2 transmits corresponding data over the wireless communication link 128 using allocated channel A-D (such as a full 20 MHz channel). If needed, note that the communication device 120-2 can be allocated use of the 20 MHz channel A-D for multiple back-to-back time frames. That is, during frame #0 and #1, the communication device 120-2 transmits data using a center carrier frequency CF1 (such as in the center of the corresponding allocated 20 MHz band).

Further, in a manner as previously discussed, the communication device 120-1 can be configured to generate and forward a request for bandwidth to the communication management resource 140. In response to receiving the request for bandwidth (such as during frame #1 or prior), and to accommodate the request, for frame #2, the communication management resource 140 subdivides the 20 MHz channel into a first sub-channel A-B (such as a 2 MHz sub-channel) and a second sub-channel of A-D (such as an 18 MHz sub-channel).

In one embodiment, the whole 20 MHz channel may originally be allocated for use by the communication device 120-2. Because the communication device 120-1 is identified as a low latency device or requires high priority data transmissions, as shown between frame #1 and the #2, the communication management resource 140 can be configured to reduce the amount of bandwidth allocated to communication device 120-2 during frame #2 to accommodate the needs of the communication device 120-1.

The communication management resource 140 then notifies communication device 120-1 that it is assigned to communicate in frame #2 using the 2 MHz sub channel A-B; the communication management resource 140 notifies communication device 120-2 has been assigned to communicate in frame #2 using the adjusted 18 MHz sub channel A-D. Note that splitting of the original channel to accommodate the communication device 120-1 in frame #2 requires that the communication device 120-1 use center frequency CF2 instead of center frequency CF1. The communication management resource 140 notifies the communication device 120-1 to communicate using center frequency CF3 in frame #2.

Accordingly, as shown in frame #2, the communication management resource 140 allocates the first wireless sub-channel A-B to the first communication device 120-1 and the second wireless sub-channel A-D to the second communication device 120-2. In accordance with the allocation of sub-channels in frame #2, the communication device 120-1 and the communication device 120-2 simultaneously communicate data over the available wireless bandwidth to the wireless access point 105-1. The wireless access point 105-1 simultaneously receives first communications over the first sub-channel A-B from the first communication device 120-1 and second communications over the second sub-channel A-D from the second communication device 120-2.

As previously discussed, note again that the communication management resource 140 may initially allocate the whole channel in frame #1 for use by the second communication device 120-2. Thus, the wireless channel A-D can be initially allocated for use by a second communication device to communicate with the wireless access point 105-1 at or around a time of receiving the request for bandwidth from communication device 120-1. In such an instance, to accommodate the request for wireless bandwidth from the first communication device 120-1, the communication management resource 140 allocates a less-than-all portion (2 MHz) of the available 20 MHz wireless channel to the first communication device 120-1 for use in the second frame. Thus, the communication management resource 140 reduces the amount of bandwidth in the wireless channel (original 20 MHz channel assigned in frame #1) to 18 MHz channel in frame #2 such that the remaining 2 MHz of bandwidth (channel A-B) was available for use in frame #2 by the first communication device 120-1. This partitioning of channels into corresponding sub-channels on an as-needed basis accommodates devices that need a relatively small amount of bandwidth, but need it immediately.

As previously discussed, the apportionment of available bandwidth by the communication management resource 140 can depend upon any number of factors such as the network address of the communication device requesting bandwidth, an identified classification type of the communication device requesting bandwidth, the type of data being transmitted, the classification of an application requesting the band with, priority assigned to the subscriber using the corresponding communication device, etc.

In this example embodiment, because the communication device 120-1 is identified as being a refrigerator requiring low latency channel allocation and low bandwidth, upon request, the communication management resource 140 immediately or within a reasonable time allocates a relatively low bandwidth (2 MHz sub channel A-B having center frequency CF3 in frame #2) to accommodate communications from the communication device 120-1 to the wireless access point 105-1. Conversely, because the communication device 120-2 is known to be a computer device requiring high bandwidth, the communication management resource 140 allocates a relatively high bandwidth (18 MHz sub channel A-D in frame #2) to accommodate communications from the communication device 120-2 to the wireless access point 105-2.

As further shown in FIG. 4, the communication management resource 140 allocates use of the available wireless spectrum in network environment 100 amongst the multiple communication devices over subsequent frames. For example, in frame #3, the communication management resource 140 subdivides a respective 20 MHz channel and allocates 2 MHz of bandwidth (channel A-B, center frequency CF3) for use by the communication device 120-1; the communication management resource 140 allocates 18 MHz of bandwidth (channel A-E, center frequency CF2) for use by the communication device 120-3.

For frame #4, in response to receiving request from multiple communication devices including communication device 120-1, communication device 120-2, and communication device 120-3, the communication management resource 140 increases the overall channel width from 20 MHz to 40 MHz to accommodate the need for high data throughput amongst the multiple communication devices. As shown, the communication management resource 140 subdivides a respective 40 MHz channel and allocates 2 MHz of bandwidth (channel A-B, center frequency CF3) of the 40 MHz channel for use by the communication device 120-1; the communication management resource 140 allocates 18 MHz of bandwidth (channel A-E, center frequency CF2) for use by the communication device 120-2; the communication management resource 140 allocates 20 MHz of bandwidth (channel A-D, center frequency CF4) for use by the communication device 120-2.

Note that in certain instances, the communication device 120-1 may request use of the available wireless spectrum in network environment 100 at a time in which no other devices wish to use the available wireless spectrum. For example, prior to frame #102, assume that the communication device 120-1 is the only communication device that requests use of bandwidth to communicate with wireless access point 105-1. To accommodate the request, the communication management resource 140 subdivides a corresponding 20 MHz channel, and then allocates 2 MHz of the 20 MHz channel (center frequency CF5) for use by the communication device 120-1 in frame #102. Note that a remaining 18 MHz portion of the corresponding available 20 MHz channel in frame #102 is unused by any of the communication devices in communication with wireless access point 105-1. In one embodiment, the unused portion of the wireless bandwidth in frame #102 can be used by another communication device communicating with a different wireless access point.

In a similar manner of allocating a channel and/or one or more sub-channels to the communication devices 120 in the upstream direction as previously discussed, note that the communication management resource 140 can be configured to dynamically allocate use of available wireless bandwidth in the downstream direction to the communication devices 120. For example, as the wireless access point receives communications addressed for delivery to the different communication devices 120, the communication management resource 140 dynamically subdivides an appropriate channel (such as 20 MHz, 40 MHz, 80 MHz, or channel of any other size, etc.) into multiple sub-channels for delivery of communications to the communication devices 120. In such an instance, the communication management resource 140 provides notification to the different communication devices 120 of appropriate bandwidth information and center frequency information for retrieving the downstream communications in the appropriate time frames.

Figure 5:
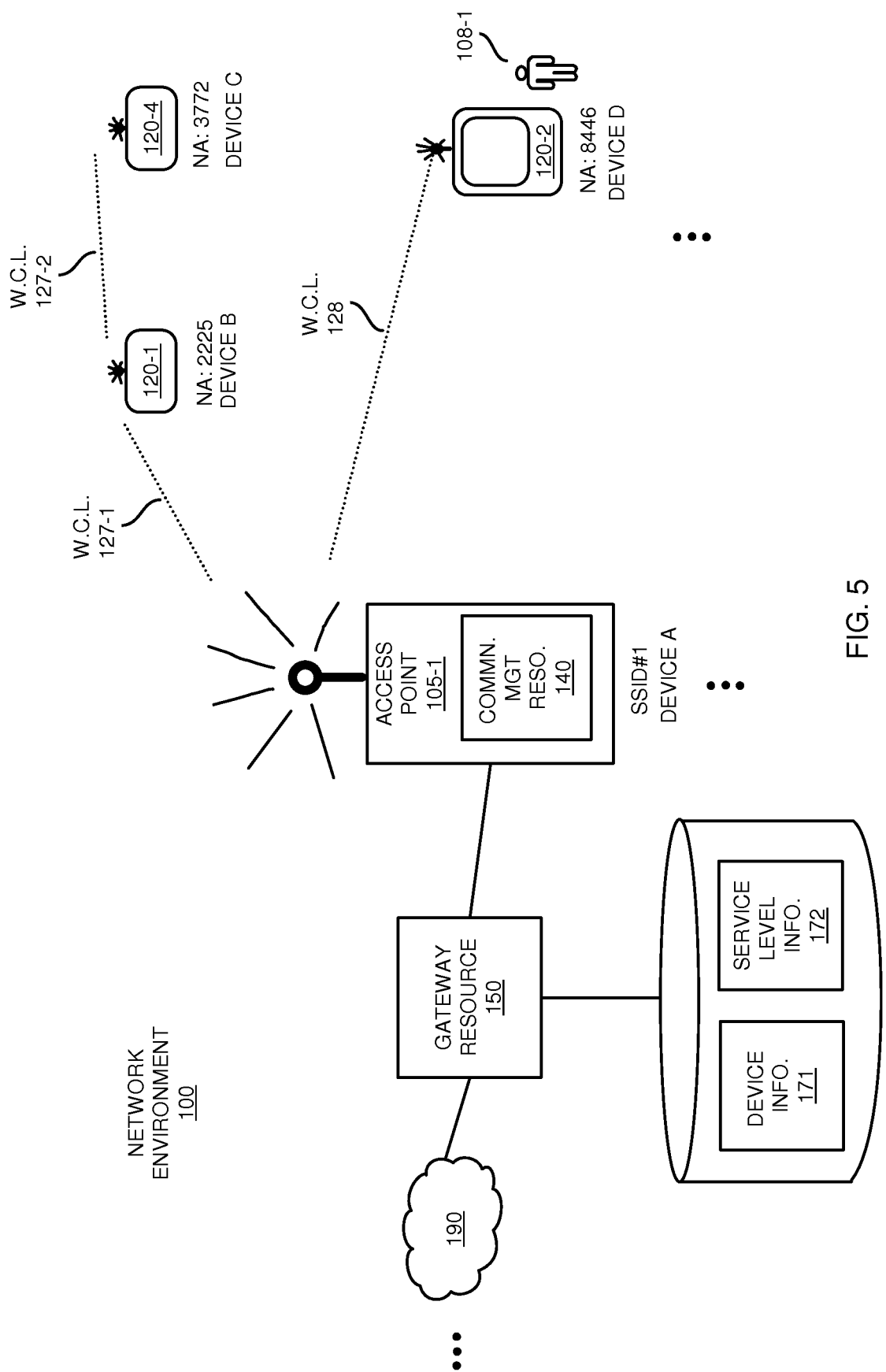
FIG. 5 is an example diagram illustrating cascading of communication devices and partitioned use of bandwidth for the cascaded communication devices according to embodiments herein.

FIG. 5 is an example diagram illustrating cascading of communication devices and partitioning of bandwidth for the cascaded communication devices according to embodiments herein.

As shown in this example embodiment, the communication device 120-1 can be configured to behave as though it was a wireless access point with respect to one or more other communication devices. In this example, when acting as a proxy, the communication device 120-1 receives communications over wireless communication link 127-2 from the communication device 120-4. The communication device 120-1 forwards the communications received from communication device 120-4 over wireless communication link 127-1 to wireless access point 105-1.

For example, as shown, and as previously discussed, the communication device 120-1 can be configured to establish the respective wireless communication link 127-1 to communicate with wireless access point 105-1. Additionally, the communication device 120-4 establishes the respective wireless communication link 127-2 to communicate with communication device 120-1.

During operation, in the downstream direction, assume that the wireless access point 105-1 transmits first communications (such as wireless encoded data packets) to the communication device 120-1 over wireless communication link 127-1. The first communications are addressed for delivery to the communication device 120-1. Because the first communications are addressed for delivery to the communication device 120-1, the communication device 120-1 processes the communications locally and does not forward the second communications to the communication device 120-4.

Additionally, in the downstream direction, the wireless access point 105-1 transmits second communications addressed to the communication device 120-4 to communication device 120-1. Because the second communications are addressed for delivery to the communication device 120-4, the communication device 120-1 forwards the second communications to the communication device 120-4.

In the upstream direction, the communication device 120-1 transmits its own generated messages (such as third communications) as well as additional messages (such as fourth communications) received from the communication device 120-4 (over wireless communication link 127-2) to the wireless access point 105-1 over wireless communication link 127-1. In other words, as previously discussed, the communication device 120-1 relays fourth communications generated by the communication device 120-4 over wireless communication link 127-1 to wireless access point 105-1. Wireless access point 105-1 further transmits the corresponding communications upstream through gateway resource 150 to network 190 for delivery to the appropriate target resource.

As further discussed below, the communication management resource 140 can be configured to vary an amount of bandwidth allocated on each of the wireless communication links 127 to convey the third communications and fourth communications to wireless access point 105-1 or convey the first communications and second communications to the wireless access point 105-1.

Figure 6:
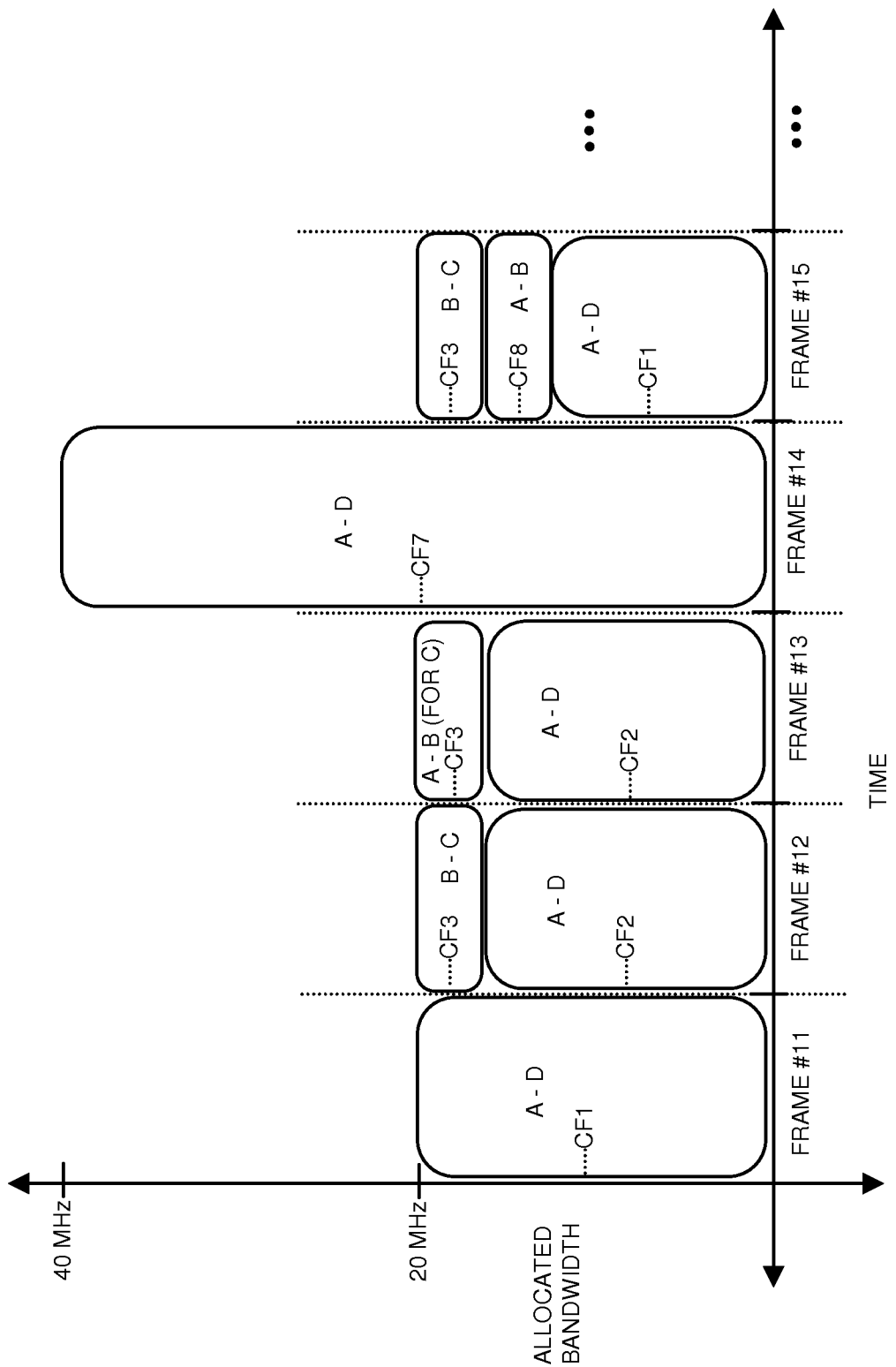
FIG. 6 is an example diagram illustrating allocation of bandwidth to multiple communication devices according to embodiments herein.

FIG. 6 is an example diagram illustrating allocation of bandwidth to multiple communication devices according to embodiments herein.

As shown in this example embodiment, the communication management resource 140 allocates use of channel A-D to convey communications between the communication device 120-2 (device D) over wireless communication link 128 in frame #11. In a manner as previously discussed, the communication management resource 140 can be configured to allocate a channel (such as a 20 MHz channel with center frequency CF1) to support upstream and/or downstream communications.

Assume in this example that the communication device 120-4 communicates a request (such as during or prior to frame #11) for bandwidth to communication device 120-1. In such an instance, the communication device 120-1 forwards the request to communication management resource 140. To satisfy the request for bandwidth, the wireless access point subdivides the available 20 MHz channel to include channel B-C as well as channel A-D. The communication management resource 140 allocates channel B-C for use by the communication device 120-4 in frame #12. The communication management resource 140 allocates use of channel A-D for use by the communication device 120-1 in frame #12. In one embodiment, the communication device 120-1 communicates notification of the allocation of channel B-C and center frequency information CF3 to communication device 120-4. Accordingly, via the relayed message from communication device 120-1, the communication device 120-4 is informed of allocation of channel B-C in frame #12.

Note that the amount of bandwidth allocated for use by the communication device 120-4 in frame #12 can be determined in a similar manner as previously discussed. For example, in one embodiment, the request for bandwidth originating from communication device 120-4 can include network address information 3772. The communication management resource 140 can be configured to perform a similar analysis (based on forwarded network address information 3772 or other unique identifier information associated with the communication device 120-4) as previously discussed to identify appropriate bandwidth to accommodate the communication device 120-4 and transmission of corresponding data to the communication device 120-1.

In accordance with further embodiments, the communication device 120-1 buffers the corresponding data received from communication device 120-4 during the frame #12. In addition to allocating channel B-C during frame #12, the communication management resource 140 can be configured to anticipate the need by the communication device 120-1 to forward any buffered data received from communication device 120-4 during frame #12 to wireless access point 105-1. To accommodate this need, the communication management resource 140 allocates channel A-B in frame #13, during which the communication device 120-1 forwards the buffered data received in frame #12 over wireless communication link 127-1 to the wireless access point 105-1. Accordingly, embodiments herein support subdividing of channels in different time frames to support serial communications to multiple devices.

As further shown in FIG. 6, note that the communication management resource 140 can be configured to allocate use of channel A-D (such as a 2 MHz channel) for use by communication device 120-2 to communicate corresponding data over wireless communication link 128 to wireless access point 105-1.

In accordance with further embodiments, note that the communication management resource 140 can be configured to allocate use of different channels to each of the communication devices along wireless communication link 127. For example, in one embodiment assume that the communication device 120-1 and communication device 120-4 both request use of corresponding available wireless bandwidth at or around the same time. The communication device 120-1 forwards its request to communication resource 140. The communication device 120-4 transmits the request for allocation of bandwidth through communication device 120-1 to communication management resource 140. In a manner as previously discussed, the communication management resource 140 analyzes one or more attributes of the request (such as an application generating the request for transmission of data, network address information assigned to the requesting device, type of data to be transmitted, etc.) to identify appropriate bandwidth to allocate to each of the communication devices 120-1 and 120-4.

In this example embodiment, for frame #15, the communication management resource 140 allocates use of channel B-C (with center frequency CF3) for use by the communication device 120-4 to communicate data to communication device 120-1. The communication resource 140 allocates use of channel A-B (with center frequency CF8) for use by the communication device 120-1 to communicate data over wireless communication link 127-1 to wireless access point 105-1.

In this manner, communication devices such as communication device 120-1 and communication device 120-4 connected in a serial manner can be allocated appropriate bandwidth (such as a sub channel) on as needed basis to communicate data in an upstream or downstream direction.

Figure 7:
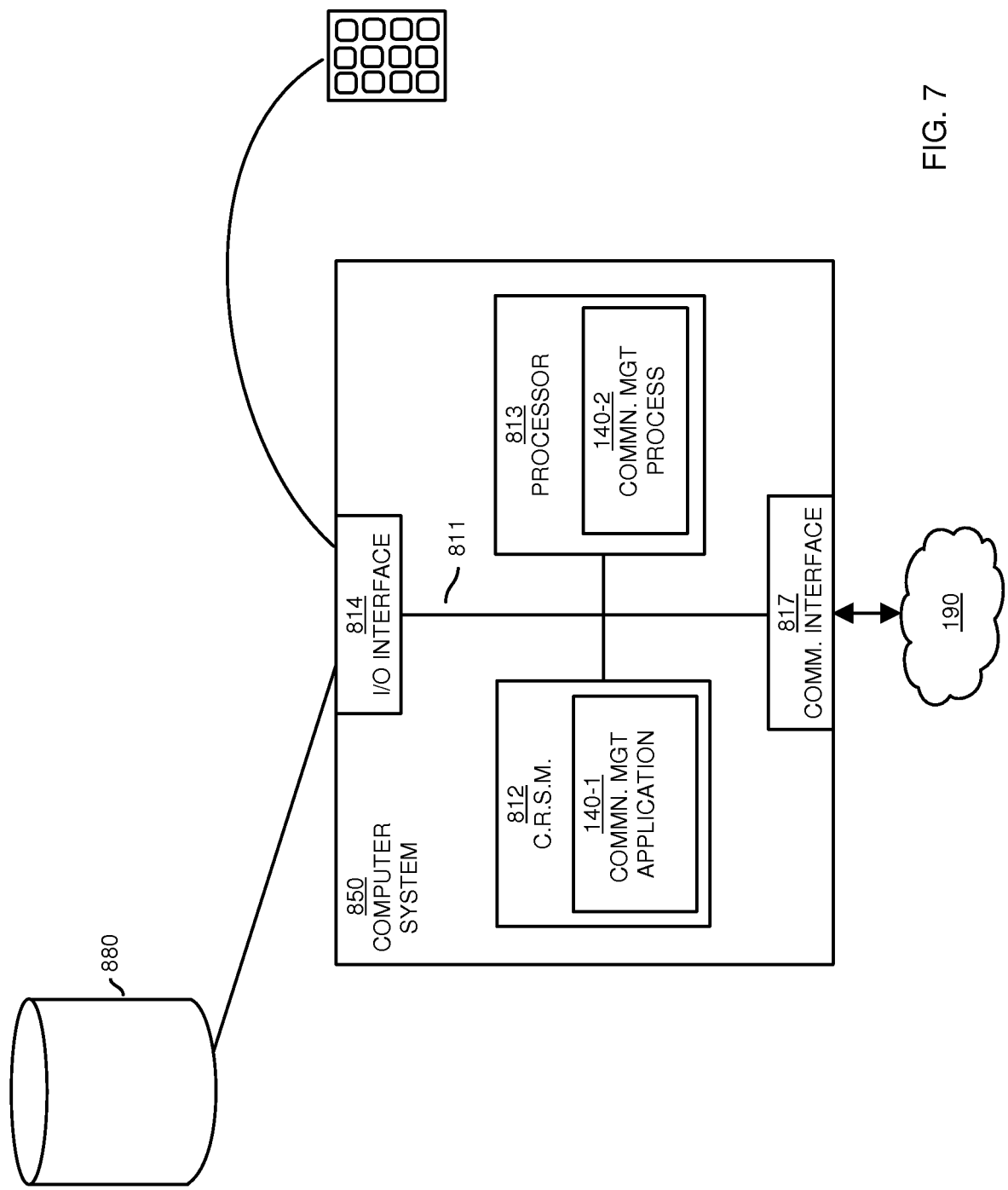
FIG. 7 is a diagram illustrating an example computer architecture in which to execute any functionality according to embodiments herein.

FIG. 7 is an example block diagram of a computer device for implementing any of the operations as discussed herein according to embodiments herein.

In one embodiment, one or more computers (such as a wireless access point, gateway resource, controller resource, communication device, etc.) implement the communication management resource 140 and corresponding operations as discussed herein.

As shown, computer system 850 of the present example includes an interconnect 811, a processor 813 (such as one or more processor devices, computer processor hardware, etc.), computer readable storage medium 812 (such as hardware storage to store instructions, data, information, etc.), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, input resource 892, a computer mouse, etc.

Computer readable storage media 812 (such as a non-transitory hardware media, hardware storage, etc.) can be any suitable hardware storage resource or device such as memory, optical storage, hard drive, rotating disk, etc. In one embodiment, the computer readable storage media 812 stores instructions executed by processor 813.

Communications interface 817 enables the computer system 850 and processor 813 to communicate over a resource such as network 190 to retrieve information from remote sources and communicate with other computers or wireless access points. I/O interface 814 enables processor 813 executing communication management application 140-1 to retrieve stored information such as from repository 880.

As shown, computer readable storage media 812 is encoded with communication management application 140-1 (e.g., software, firmware, etc.) executed by processor 813 (hardware). Communication management application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in the communication management application 140-1 stored on computer readable storage media 812.

Execution of the communication management application 140-1 produces processing functionality such as communication management process 140-2 in processor 813. In other words, the communication management process 140-2 associated with processor 813 represents one or more aspects of executing communication management application 140-1 within or upon the processor 813 in the computer system 850.

Those skilled in the art will understand that the computer system 850 can include other processes and/or software and hardware components, such as an operating system that controls allocation and use of hardware resources to execute communication management application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 and its parts may reside at any of one or more locations or can be included in any suitable one or more resource in network environment 100 to implement functionality as discussed herein.

Functionality supported by the different resources will now be discussed via flowcharts in FIGS. 8 and 9. Note that the steps in the flowcharts below can be executed in any suitable order.

Figure 8:
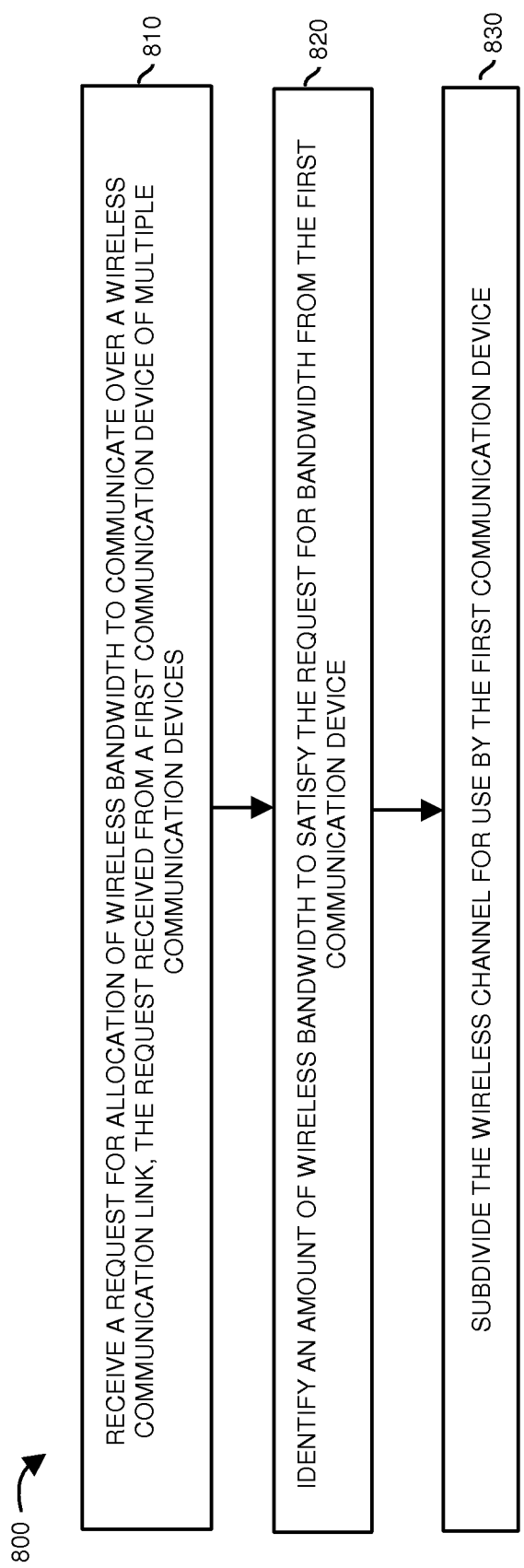
FIGS. 8 and 9 are example diagrams illustrating methods according to embodiments herein.

FIG. 8 is a flowchart 800 illustrating an example method according to embodiments. Note that there will be some overlap with respect to concepts as discussed above.

In processing block 810, the communication management resource 140 receives, from a first communication device 120-1 of multiple communication devices 120, a request for allocation of wireless bandwidth to communicate over wireless communication link 127-1.

In processing block 820, the communication management resource 140 identifies an amount of wireless bandwidth suitable to satisfy the request for bandwidth from the first communication device 120-1.

In processing block 830, the communication management resource 140 subdivides the wireless channel for use by the first communication device 120-1.

Figure 9:
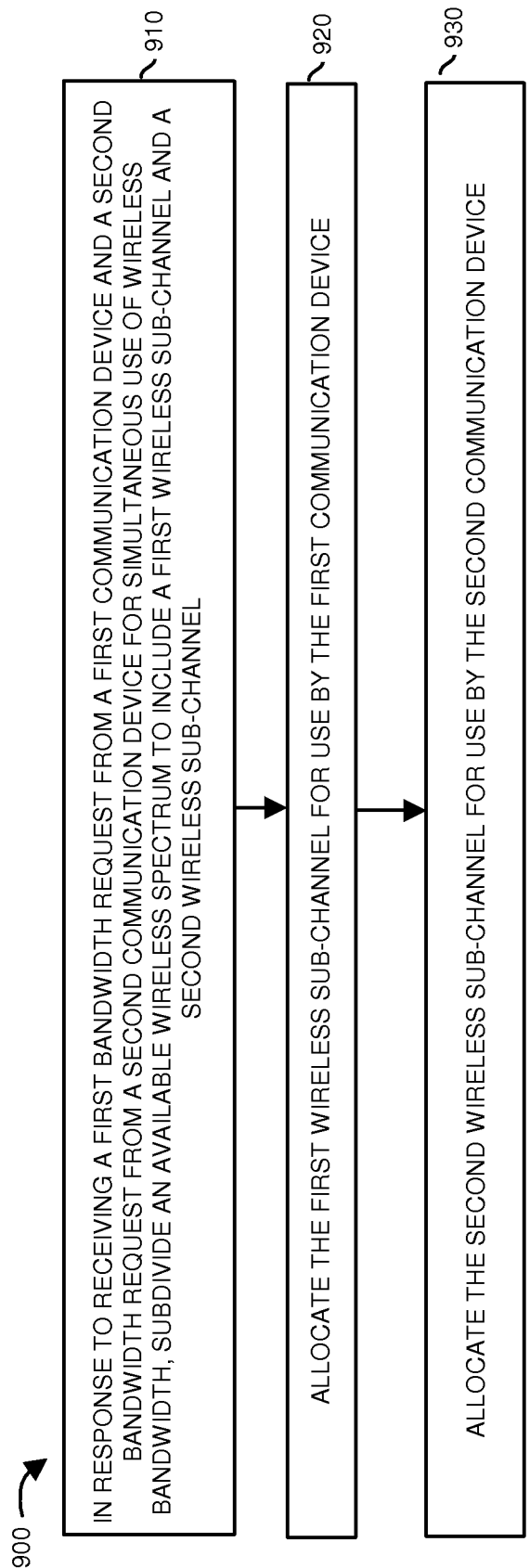

FIG. 9 is a flowchart 900 illustrating an example method according to embodiments. Note that there will be some overlap with respect to concepts as discussed above.

In processing block 910, in response to receiving a first bandwidth request from a first communication device 120-1 and a second bandwidth request from a second communication device 120-2 for simultaneous use of wireless bandwidth, the communication management resource 140 subdivides an available wireless spectrum to include a first wireless sub-channel and a second wireless sub-channel.

In processing block 920, the communication management resource allocates the first wireless sub-channel for use by the first communication device 120-1.

In processing block 930, the communication management resource 140 allocates the second wireless sub-channel for use by the second communication device 120-2.

Note again that techniques herein are well suited to provide more efficient use of available wireless spectrum, especially in a wireless communication systems that dynamically split an available channel (of varying channel bandwidth) for use by multiple communication devices. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While one or more inventions have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a communication management resource in a network environment that allocates use of a wireless channel over time to multiple communication devices in communication with a wireless access point:
   from a first communication device of the multiple communication devices, receiving a request for allocation of wireless bandwidth to communicate over a wireless communication link;
   identifying an amount of wireless bandwidth suitable to satisfy the request for bandwidth from the first communication device; and
   based on the identified amount of wireless bandwidth suitable to satisfy the request from the first communication device, subdividing the wireless channel for use by the first communication device;
   based on the identified amount of wireless bandwidth, allocating a less-than-all portion of the wireless channel to the first communication device to communicate data over the wireless communication link to the wireless access point;
   in response to detecting completion of the first communication device using the less-than-all portion of the channel to transmit a data payload, reallocating the less-than-all portion of the channel for use by another communication device.

2. The method as in claim 1, wherein the less-than-all portion of the wireless channel is a first portion of the wireless channel, the method further comprising:
   allocating a second portion of the wireless channel for use by a second communication device of the multiple communication devices, the second portion of the wireless channel allocated for use by the second communication device to simultaneously communicate with the wireless access point while the first communication device uses the first portion of the wireless channel to communicate with the wireless access point.

3. The method as in claim 2, wherein the wireless channel is one of multiple wireless channels available for allocation to the multiple communication devices.

4. A method comprising:
   at a communication management resource in a network environment that allocates use of a wireless channel over time to multiple communication devices in communication with a wireless access point:
- from a first communication device of the multiple communication devices, receiving a request for allocation of wireless bandwidth to communicate over a wireless communication link;
- identifying an amount of wireless bandwidth suitable to satisfy the request for bandwidth from the first communication device; and
- based on the identified amount of wireless bandwidth suitable to satisfy the request from the first communication device, subdividing the wireless channel for use by the first communication device;
- wherein the wireless channel is a predetermined bandwidth available for use by multiple communication devices in the network environment, the wireless channel being one of multiple channels allocated from an available wireless bandwidth;
- wherein the wireless channel is initially allocated for use by a second communication device to communicate with the wireless access point at a time of receiving the request; and
- wherein allocating a less-than-all portion of the wireless channel to the communication device includes: reducing an amount of bandwidth in the wireless channel that is assigned for use by the second communication device to communicate with the wireless access point, the reduced amount of bandwidth being the less-than-all portion of bandwidth reassigned for use by the first communication device.

5. A method comprising:
at a communication management resource in a network environment that allocates use of a wireless channel over time to multiple communication devices in communication with a wireless access point:
- from a first communication device of the multiple communication devices, receiving a request for allocation of wireless bandwidth to communicate over a wireless communication link;
- identifying an amount of wireless bandwidth suitable to satisfy the request for bandwidth from the first communication device; and
- based on the identified amount of wireless bandwidth suitable to satisfy the request from the first communication device, subdividing the wireless channel for use by the first communication device;
- wherein allocating a less-than-all portion of the wireless channel to the first communication device further comprises: allocating the less-than-all portion of the wireless channel to the first communication device for a time span, the method further comprising:
- for a first duration of time overlapping with the time span, allocating a second portion of the wireless channel for use by a second communication device in the network environment to communicate with the wireless access point; and
- for a second duration of time following the first duration of time and overlapping with the time span, allocating the second portion of the wireless channel for use by a third communication device in the network environment to communicate with the wireless access point.

6. A method comprising:
at a communication management resource in a network environment that allocates use of a wireless channel over time to multiple communication devices in communication with a wireless access point:
- from a first communication device of the multiple communication devices, receiving a request for allocation of wireless bandwidth to communicate over a wireless communication link;
- identifying an amount of wireless bandwidth suitable to satisfy the request for bandwidth from the first communication device; and
- based on the identified amount of wireless bandwidth suitable to satisfy the request from the first communication device, subdividing the wireless channel for use by the first communication device;
- wherein identifying the amount of wireless bandwidth further comprises:
- identifying a classification type of an application on the first communication device generating the request for allocation of the wireless bandwidth;
- mapping the classification type to flow service settings associated with the application; and
- as specified by the flow service settings, transmitting communications over a subdivided portion of the wireless channel allocated for use by the first communication device.

7. The method as in claim 6 further comprising:
at the wireless access point, receiving notification that the first communication device is in wireless communication with a second communication device;
transmitting first communications from the wireless access point to the first communication device, the first communications addressed for delivery to the first communication device; and
transmitting second communications from the wireless access point to the first communication device, the second communications addressed for delivery to the second communication device, the first communication device forwarding the second communications to the second communication device.

8. The method as in claim 7 further comprising:
varying an amount of bandwidth allocated on the wireless communication link to convey the first communications and second communications to the first communication device.

9. A method comprising:
at a communication management resource in a network environment that allocates use of a wireless channel over time to multiple communication devices in communication with a wireless access point:
- from a first communication device of the multiple communication devices, receiving a request for allocation of wireless bandwidth to communicate over a wireless communication link;
- identifying an amount of wireless bandwidth suitable to satisfy the request for bandwidth from the first communication device;
- based on the identified amount of wireless bandwidth suitable to satisfy the request from the first communication device, subdividing the wireless channel for use by the first communication device; and
- in response to detecting completion of the first communication device using a less-than-all portion of the channel to transmit a data payload to the wireless access point, reallocating all of the wireless channel for use by another communication device.

10. A method comprising:
at a communication management resource in a network environment that allocates use of a wireless channel over time to multiple communication devices in communication with a wireless access point:
  from a first communication device of the multiple communication devices, receiving a request for allocation of wireless bandwidth to communicate over a wireless communication link;
  identifying an amount of wireless bandwidth suitable to satisfy the request for bandwidth from the first communication device; and
  based on the identified amount of wireless bandwidth suitable to satisfy the request from the first communication device, subdividing the wireless channel for use by the first communication device;
  wherein identifying the amount of wireless bandwidth further comprises:
  utilizing a network address received from the first communication device to identify a classification type assigned to the first communication device; and
  utilizing the classification type assigned to the first communication device to identify wireless bandwidth eligibility assigned to the first communication device.

11. The method as in claim 10, wherein identifying the amount of wireless bandwidth further comprises:
  identifying service level settings associated with an application generating the request for the wireless bandwidth; and
  wherein a subdivided portion of the wireless channel allocated for use by the first communication device supports conveyance of communications as specified by the service level settings.

12. A method comprising:
  at a communication management resource managing communications associated with a wireless access point in a wireless network environment:
  in response to receiving a first bandwidth request from a first communication device and a second bandwidth request from a second communication device for simultaneous use of wireless bandwidth, subdividing an available wireless spectrum to include a first wireless sub-channel and a second wireless sub-channel;
  allocating the first wireless sub-channel for use by the first communication device;
  allocating the second wireless sub-channel for use by the second communication device;
  simultaneously receiving first communications over the first wireless sub-channel from the first communication device and second communications over the second wireless sub-channel from the second communication device; and
  producing the first wireless sub-channel to support conveyance of data at a substantially lower rate than the second wireless sub-channel; and
  sizing the first wireless sub-channel and the second wireless sub-channel based at least in part on network addresses assigned to the first communication device and the second communication device.

13. The method as in claim 12 further comprising:
allocating the first wireless sub-channel to the first communication device and the second wireless sub-channel to the second communication device for use in a given time frame.

14. The method as in claim 12, wherein subdividing the available wireless spectrum further comprises: subdividing a wireless channel of predetermined bandwidth into the first wireless sub-channel and the second wireless sub-channel; and
  prior to subdividing the wireless channel, allocating the wireless channel for use by a third communication device, the third communication device using the wireless channel prior to the first communication device of the second communication device simultaneously using the first wireless sub-channel and the second wireless sub-channel.

15. The method as in claim 12, wherein the wireless channel is a WiFi™ channel dynamically sub-divided and allocated for use amongst multiple communication devices in the network environment.

16. A method comprising:
  at a communication management resource in a network environment that allocates use of a wireless channel over time to multiple communication devices in communication with a wireless access point:
  from a first communication device of the multiple communication devices, receiving a request for allocation of wireless bandwidth to communicate over a wireless communication link;
  identifying an amount of wireless bandwidth suitable to satisfy the request for bandwidth from the first communication device; and
  based on the identified amount of wireless bandwidth suitable to satisfy the request from the first communication device, subdividing the wireless channel for use by the first communication device;
  identifying a classification type associated with the first communication device generating the request for allocation of the wireless bandwidth;
  identifying security setting information assigned to the identified classification type; and
    as specified by the identified security setting information, transmitting communications over a subdivided portion of the wireless channel to the first communication device in accordance with security settings as specified by the identified security setting information.

17. The method as in claim 16 further comprising:
allocating use of subdivided portions of the wireless channel in accordance with space division multiple access techniques to provide spatial isolation amongst the multiple communication devices.

18. The method as in claim 16, wherein the wireless channel is a first wireless channel of multiple wireless channels available for use by the multiple communication devices, the multiple wireless channels including the first wireless channel and a second wireless channel.

19. The method as in claim 18, wherein the first wireless channel and the second wireless channel are of equal bandwidth.

20. The method as in claim 19, wherein subdividing the wireless channel for use by the first communication device includes:
  in response to detecting that the identified amount of wireless bandwidth is substantially less than a full capacity of the first wireless channel, allocating a less-than-all portion of the first wireless channel to the first communication device.

21. A method comprising:
  at a communication management resource in a network environment that allocates use of a wireless channel over time to multiple communication devices in communication with a wireless access point:

from a first communication device of the multiple communication devices, receiving a request for allocation of wireless bandwidth to communicate over a wireless communication link;

identifying an amount of wireless bandwidth suitable to satisfy the request for bandwidth from the first communication device; and based on the identified amount of wireless bandwidth suitable to satisfy the request from the first communication device, subdividing the wireless channel for use by the first communication device;

for a first time slot of multiple time slots, assigning the wireless channel for use by a second communication device;

wherein subdividing the wireless channel for use by the first communication device includes: i) splitting the wireless channel into a first wireless sub-channel and a second wireless sub-channel; and for a second time slot of the multiple time slots: i) assigning the first wireless sub-channel to the first communication device, and ii) assigning the second wireless sub-channel to the second communication device.

22. The method as in claim 21, wherein the wireless channel is assigned a first carrier frequency;

wherein the first wireless sub-channel is assigned a second carrier frequency; and wherein the second wireless sub-channel is assigned a third carrier frequency, the third carrier frequency different than the second carrier frequency.

23. The method as in claim 22 further comprising:

notifying the first communication device of a corresponding bandwidth associated with the first wireless sub-channel; and notifying the second communication device of a corresponding bandwidth associated with the second wireless sub-channel.

24. The method as in claim 23 further comprising:

notifying the first communication device that the second time slot has been assigned for use by the first communication device; and notifying the second communication device that the second time slot has been assigned for use by the second communication device.

25. The method as in claim 24, wherein the corresponding bandwidth associated with the first wireless sub-channel is greater in magnitude than the corresponding bandwidth associated with the second wireless sub-channel.

26. A method comprising:

at a communication management resource in a network environment that allocates use of a wireless channel over time to multiple communication devices in communication with a wireless access point:

from a first communication device of the multiple communication devices, receiving a request for allocation of wireless bandwidth to communicate over a wireless communication link;

identifying an amount of wireless bandwidth suitable to satisfy the request for bandwidth from the first communication device; and based on the identified amount of wireless bandwidth suitable to satisfy the request from the first communication device, subdividing the wireless channel for use by the first communication device;

for a first time slot of multiple time slots, assigning the wireless channel for use by a second communication device;

wherein subdividing the wireless channel includes: i) splitting the first wireless channel into a first wireless sub-channel, a second wireless sub-channel, and a third wireless sub-channel; and assigning the first wireless sub-channel, the second wireless sub-channel, and the third wireless sub-channel for use in a second time slot of the multiple time slots;

wherein the first sub-channel is assigned for use by the first communication device in the second time slot, the second sub-channel is assigned for use by the second communication device in the second time slot, and the third sub-channel is assigned for use by a third communication device in the second time slot.

* * * * *